(12) United States Patent
AlMahmoud

(10) Patent No.: US 9,972,188 B2
(45) Date of Patent: May 15, 2018

(54) SONAR BASED DROWNING DETECTION SYSTEM, METHOD AND KIT

(71) Applicant: Khalifa University of Science and Technology, Abu Dhabi (AE)

(72) Inventor: Abdelrahman Ali AlMahmoud, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 867 days.

(21) Appl. No.: 14/510,339

(22) Filed: Oct. 9, 2014

(65) Prior Publication Data

US 2016/0104359 A1 Apr. 14, 2016

(51) Int. Cl.
| | |
|---|---|
| G08B 21/08 | (2006.01) |
| G01S 15/66 | (2006.01) |
| G01S 7/539 | (2006.01) |
| G01S 15/42 | (2006.01) |
| G01S 15/88 | (2006.01) |

(52) U.S. Cl.
CPC .............. *G08B 21/08* (2013.01); *G01S 7/539* (2013.01); *G01S 15/42* (2013.01); *G01S 15/66* (2013.01); *G01S 15/88* (2013.01); *G08B 21/084* (2013.01)

(58) Field of Classification Search
CPC ....... G08B 21/08; G08B 21/084; G01S 7/539; G01S 15/88; G01S 15/66; G01S 15/42
See application file for complete search history.

(56) References Cited

U.S. PATENT DOCUMENTS

| | | | | | |
|---|---|---|---|---|---|
| 5,200,931 | A | * | 4/1993 | Kosalos | .............. G01S 7/52003 367/11 |
| 6,133,838 | A | * | 10/2000 | Meniere | ............... G08B 21/082 340/566 |
| 2014/0111332 | A1 | * | 4/2014 | Przybylko | .............. G06Q 10/00 340/539.1 |
| 2016/0104359 | A1 | * | 4/2016 | AlMahmoud | .......... G08B 21/08 367/112 |

* cited by examiner

*Primary Examiner* — Daniel Pihulic
(74) *Attorney, Agent, or Firm* — Hayes Soloway PC

(57) ABSTRACT

There is provided a system for detecting a drowning person within a water body, the system comprising (i) sonar sensors for forming a three dimensional grid of sonar waves within the water body, the grid having three dimensional grid cells; (ii) a movement path tracing unit adapted to be connected to the sonar sensors for tracing a movement path of a person within the water body by determining a sequence of successive grid cells crossed by the person within the grid in the course of said movement path, the determination of the successive grid cells being made based on detected propagation delays of the sonar waves forming the grid; and (iii) a drowning detection unit adapted to be connected to the movement path tracing unit for analyzing the movement path of the person and issuing an alarm when the movement path of the person is indicative of a drowning person movement path. There is also provided a kit and method for detecting a drowning person within a water body.

22 Claims, 6 Drawing Sheets

SONAR BASED DROWNING DETECTION SYSTEM, METHOD AND KIT

FIELD OF THE INVENTION

The present invention relates generally to the field of drowning monitoring, and more specifically to a system for sonar based drowning detection system, kit and method.

BACKGROUND OF THE INVENTION

Every day, about ten people die from unintentional drowning. Of these, two are children aged 14 or younger. Drowning ranks fifth among the leading causes of unintentional injury death in the United States.

From 2005-2009, there were an average of 3,533 fatal unintentional drowning (non-boating related) annually in the United States—about ten deaths per day. An additional 347 people died each year from drowning in boating-related incidents. About one in five people who die from drowning are children 14 and younger. For every child who dies from drowning, another five receive emergency department care for nonfatal submersion injuries. More than 50% of drowning victims treated in emergency departments (EDs) require hospitalization or transfer for further care (compared with a hospitalization rate of about 6% for all unintentional injuries). These nonfatal drowning injuries can cause severe brain damage that may result in long-term disabilities such as memory problems, learning disabilities, and permanent loss of basic functioning (e.g., permanent vegetative state).

Nearly 80% of people who die from drowning are male. Children ages 1 to 4 have the highest drowning rates. In 2009, among children 1 to 4 years old who died from an unintentional injury, more than 30% died from drowning. Among children ages 1 to 4, most drowning occurs in home swimming pools. Drowning is responsible for more deaths among children 1-4 than any other cause except congenital anomalies (birth defects). Among those 1-14, fatal drowning remains the second-leading cause of unintentional injury-related death behind motor vehicle crashes.

The main factors that affect drowning risk are lack of swimming ability, lack of barriers to prevent unsupervised water access, lack of close supervision while swimming, location, and failure to wear life jackets, alcohol use, and seizure disorders.

Drowning can happen quickly and quietly anywhere there is water (such as bathtubs, swimming pools, buckets), and even in the presence of lifeguards.

People of different ages drown in different locations. For example, most children ages 1-4 drown in home swimming pools. The percentage of drowning in natural water settings, including lakes, rivers and oceans, increases with age. More than half of fatal and nonfatal drowning among those 15 years and older (57% and 57% respectively) occurred in natural water settings.

There are generally three types of drowning monitoring systems, systems based on CCTV cameras, systems based on CCTV cameras with computer monitoring and automatic alarms and systems based on wristband tags with computer monitoring and automatic alarms. These systems detect objects that enter the pool but do not differentiate between swimming people and drowning people.

A drowning system based on CCTV cameras is a passive aid to the lifeguard that gives an underwater view via CCTV cameras. However it does not incorporate a detection system. This system basically gives a lifeguard additional underwater views.

The CCTV cameras with computer monitoring and automatic alarms system is essentially a computer aided detection system, that is not primarily a CCTV system and does not require a lifeguard dedicated to watch the TV monitor. The system monitors the swimming pool water and when it detects a person in potential difficulty (i.e. a static solid object of appropriate size and shape), it alerts the lifeguard via an LED monitor. The LED monitor visually flashes and produces an audible alarm. The lifeguard will be given a location on the LED screen and can also see the 'casualty' on the supervision workstation monitor. The computer continually monitors the pool assessing any potential problem.

Glare can be a potential problem with viewing monitors in bright environments for CCTV based systems. There are also cultural and religious issues with respect to the use of cameras in swimming pools in some countries which limit substantially their use in a big number of countries.

Wristbands tags are individual wristbands, about the size of a small wrist watch that are worn by users of a pool. Wristbands based monitoring systems detect wristbands that are outside set depth, movement and time parameters. If a bather (with wristband) approaches the preset parameters of the system, an alert via radio and/or ultrasonic is generated. Initially a small audio sound and flashing LED light will remind the bather to return to a safer location. If the bather does not respond appropriately, the system activates alarms on the receivers worn by the lifeguards.

Such a wristband has some drawbacks in terms of reliability some of which are as follows: It cannot be used in salt or sea water. This is a serious limitation since many new pools and water parks are being made with salt water. This means that this wristband will not reliably work in all water environments or even at the seaside. It requires line of sight between the receiver and the transmitter, so it may not work if there is an obstacle between the base-station and the child.

SUMMARY OF THE INVENTION

There is provided a system, kit and method which would overcome the above mentioned drawbacks.

As a first aspect of the invention, there is provided a system for detecting a drowning person within a water body, the system comprising:
sonar sensors for forming a three dimensional grid of sonar waves within the water body, the grid having three dimensional grid cells;
a movement path tracing unit adapted to be connected to the sonar sensors for tracing a movement path of a person within the water body by determining a sequence of successive grid cells crossed by the person within the grid in the course of the movement path, the determination of the successive grid cells being made based on detected propagation delays of the sonar waves forming the grid;
a drowning detection unit adapted to be connected to the movement path tracing unit for analysing the movement path of the person and issuing an alarm when the movement path of the person is indicative of a drowning person movement path.

As a further aspect of the invention, there is provided a kit for detecting a drowning person within a water body, the kit comprising:
sonar sensors adapted for forming a three dimensional grid of sonar waves within the water body when deployed at the water body, the grid having three dimensional grid cells;

a microcontroller running computer instructions adapted to be connected to the sonar sensors for tracing a movement path of a person within the water body by determining a sequence of successive grid cells crossed by the person within the grid in the course of the movement path, the determination of the successive grid cells being made based on detected propagation delays of the sonar waves forming the grid, and for analysing the movement path of the person and issuing an alarm when the movement path of the person is indicative of a drowning person movement path.

In an embodiment of the invention, the three dimensional grid has three orthogonal axis.

The movement path can be in any direction, following 1, 2 or 3 orthogonal dimensions including depth.

In an embodiment of the invention, the water body has a longitudinal axis, a lateral axis and a vertical axis corresponding respectively to the three orthogonal axis of the grid.

In an embodiment of the invention, the sonar sensors are monostatic sonar sensors.

In an embodiment of the invention, the sonar sensors are bistatic sonar sensors.

In an embodiment of the invention, the grid cells are uniform.

In an embodiment of the invention, the grid cells are cubic.

In an embodiment of the invention, the grid cells are smaller or equal to 1 cubic meter in volume.

In an embodiment of the invention, the movement path tracing unit and the drowning detection unit comprise at least one microcontroller or microprocessor running specific computer software.

In an embodiment of the invention, the sonar sensors have different frequency/phase operation ranges for avoiding any interference between them.

In an embodiment of the invention, the sonar sensors operate at high frequency.

As another aspect of the present invention, there is provided a method of detecting a drowning person within a water body, the method comprising:
deploying sonar sensors for forming a three dimensional grid of sonar waves within the water body, the grid having three dimensional grid cells;
tracing a movement path of a person within the water body by determining a sequence of successive grid cells crossed by the person within the grid in the course of the movement path, the determination of the successive grid cells being made based on detected propagation delays of the sonar waves forming the grid; and
analysing the movement path of the person and issuing an alarm when the movement path of the person is indicative of a drowning person movement path.

In an embodiment of the invention, the water body is a rectangular swimming pool having a first and a second pair of adjacent walls, the sonar sensors being monostatic and deployed on the first pair of adjacent walls only.

In an embodiment of the invention, the water body is a rectangular swimming pool having a first and a second pair of adjacent walls, the sonar sensors being bistatic having separated transmitters and receivers, the transmitters being deployed on the first pair of adjacent walls and the receivers being deployed on the second pair of adjacent walls.

In an embodiment of the invention, the method further comprises adjusting the resolution of the three dimensional grid by adjusting the number of the sonar sensors and the distance therebetween.

In an embodiment of the invention, the method further comprises deploying the sonar sensors equidistantly such that the grid cells are uniform.

In an embodiment of the invention, the grid cells are smaller or equal to 1 cubic meter.

BRIEF DESCRIPTION OF THE DRAWINGS

The invention will now be described with reference to the accompanying drawings, which illustrate a preferred embodiment of the present invention without restricting the scope of the invention's concept, and in which.

DETAILED DESCRIPTION OF THE INVENTION

Figure 1:
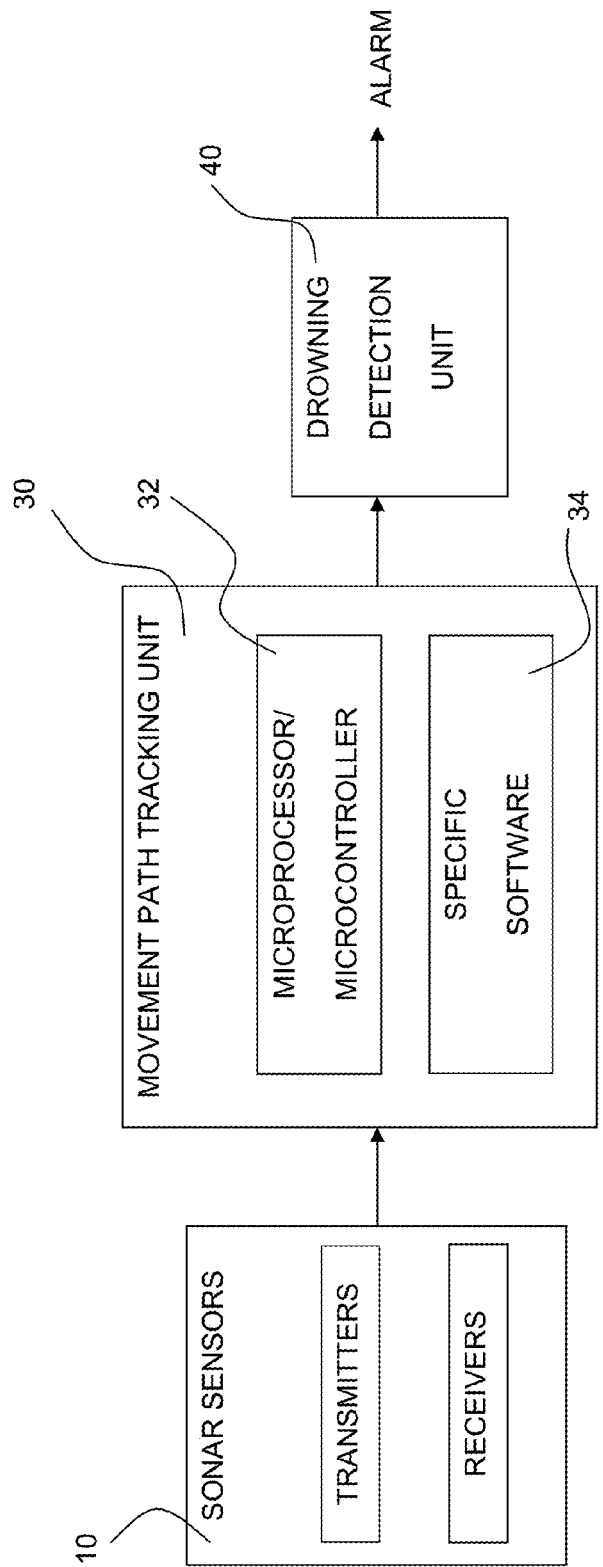
FIG. 1 is a block diagram illustrating a system for detecting a drowning person within a water body in accordance with an embodiment of this invention.
Figure 3:
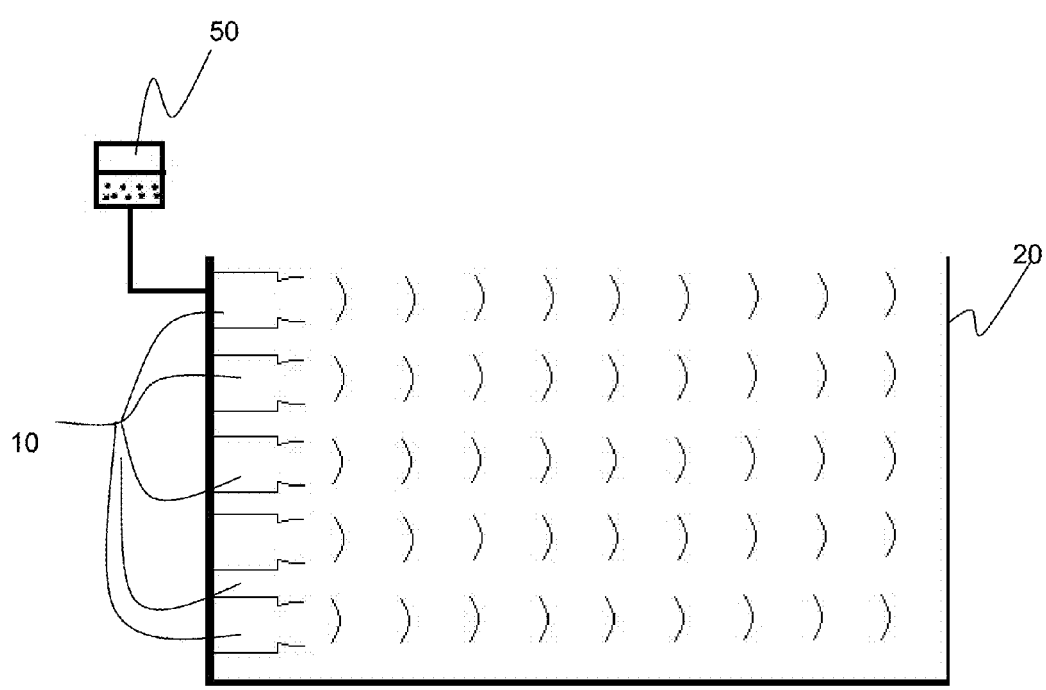
FIG. 3 depicts a 2D illustration of a water body with sonar sensors deployed in accordance with an embodiment of this invention.

As illustrated in FIGS. 1 and 3, there is provided sonar based drowning monitoring system 2. The system 2 comprises sonar sensors 10, a movement path tracing unit 30 and a drowning detection unit 40. The movement path tracing unit 30 and the drowning detection unit 40 can be constitute a same physical unit and/or be part of a same computer system 50.

The sonar sensors 10 are adapted to be deployed in a certain geometrical configuration according to the shape of the water body 20 where it is to be deployed. The sonar sensors 10 comprise sonar transmitters 14 and sonar receivers 16 for respectively transmitting and receiving sonar waves in a predefined frequency/phase range. The sonar transmitters 14 and receivers 16 can be located in the same place (monostatic operation) or separated (bistatic operation).

Figure 4:
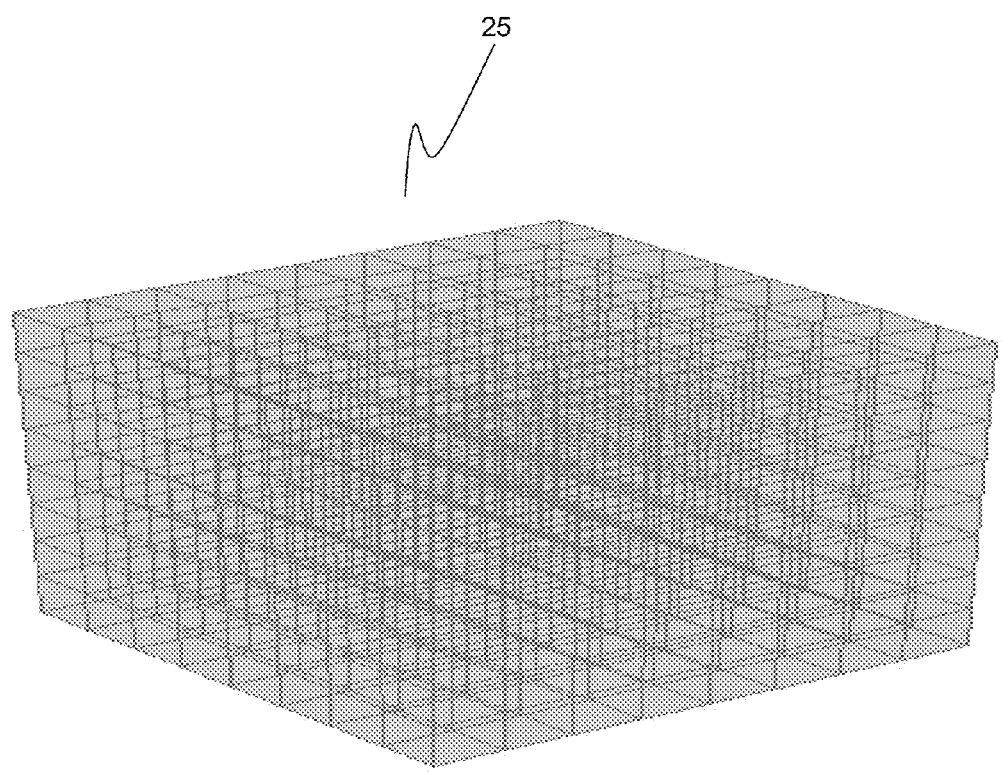
FIG. 4 depicts a three dimensional grid of sonar waves formed using sonar sensors in accordance with an embodiment of this invention.

The sonar sensors 10 are deployed in such a manner to transmit and receive directed sonar waves without dispersing or overlapping. As illustrated in FIG. 4, the sonar waves emitted by the transmitters 14 form a three dimensional grid (or mesh) of directed sonar waves 25. The three dimensional spaces between the sonar waves form the cells of the grid 25. The resolution of the grid 25 is defined by the size of the cells and can be increased or decreased based on the number and spatial configuration of the sonar sensors 10 deployed, including the distance between the sonar sensors 10.

The configuration and resolution of the grid 25 are known a priori by the movement path tracing unit 30. The system 2 allows for the detection of a person's movement between the different cells, as any position (or other obstacle) positioned in the line of sight of these sonar waves will be detected by the system 2 which is adapted to determine the exact location of this person (or other obstacle). Since drowning persons have predictable movement behaviors, the drowning detection unit 40 is adapted to detect if the person's movement between the different cells is indicative of a drowning person's movement and if it is the case issues an alarm signal.

As mentioned above, it is possible to deploy the sonar sensors 10 in a bistatic configuration where the transmitters 14 and receivers 16 of the respective sonar sensors 10 are separated. According to this configuration, for each sonar sensor 10, the transmitter 14 is located at one end of the water body and the associated receiver 16 is located at a second end of the water body. The sonar waves generated and transmitted by the transmitters 14 propagate in the direction of the receivers 16 in a line-of-sight passing through the water body. The transmitter 14 and the receiver 16 are not necessarily linked bound to each other. In a possible embodiment of the invention, any receiver can pick up the waves and understand which transmitter 14 sent it thorough for example by checking the frequency and/or phase associated with it.

The one-way path and delay of the sonar waves are known a prior by the movement path tracing unit 30. The sonar waves can be delayed or interrupted only in presence of a person (or other obstacle) in the water body 20. In a possible embodiment of the invention, each receiver 16 is adapted to receive the sonar wave emitted by its associated transmitter 14 and to filter out noises and other interfering waves. In another embodiment, any receiver can pick any wave received (regardless the transmitter from which it has been sent). The receiver can then determine the transmitter from which it has been transmitted. This can be done for example if each transmitter is tuned to a different frequency and/or phase known by the receivers and/or the movement path tracing unit 30.

Figure 2:
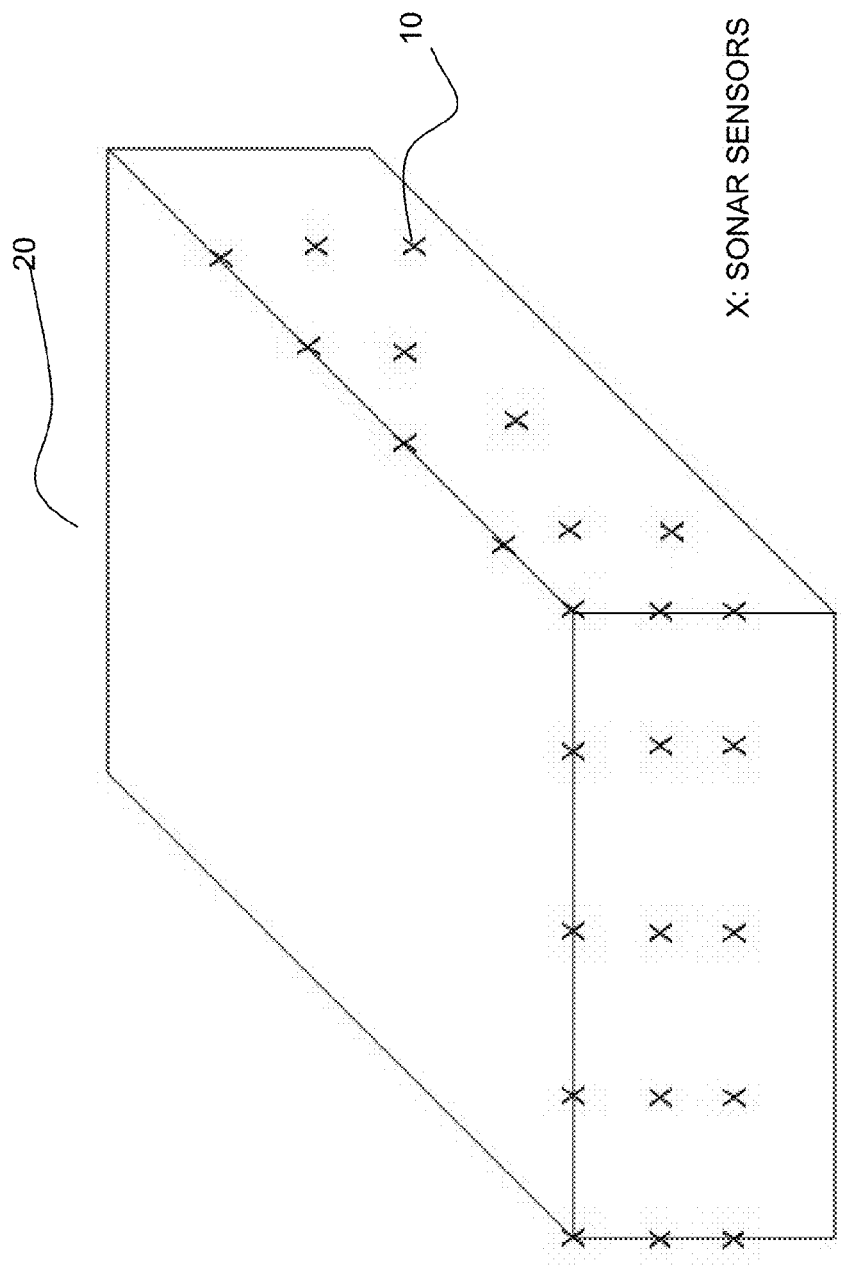
FIG. 2 depicts a 3D illustration of a water body with monostatic sonar sensors deployed on a pair of adjacent walls in accordance with an embodiment of this invention.

As illustrated in FIG. 2, it is also possible to deploy the sonar sensors 10 in a monostatic configuration where the transmitters 14 and receivers 16 are located in the same place. According to this configuration, for each sonar sensor 12, the associated transmitter 12 and receiver 14 are deployed on the same side of the water body 20. The transmitters 14 can for example be positioned on a first wall at one end of the water body 20 and the receivers 16 can be positioned on an opposing wall at a second end of the water body 20. The waves transmitted by the transmitters 14 propagate through the water body 20 from the first end to the second end of the water body 20. Arriving at the opposing wall, the sonar waves would bounce on the opposing wall and propagate back in the direction of the receivers 16. In one embodiment, the transmitters 14 and receivers 16 are deployed in such a manner that the waves hit the opposing wall at a 90 degrees angle with respect to the wall plan, so that they bounce back and return to the receivers 16 using the original propagation path. This would allow avoiding the overlapping and dispersing of sonar waves. The round trip path and delay of the sonar waves are known a prior by the movement path tracing unit 30. The sonar waves can be delayed or interrupted only in presence of a person (or another obstacle) in the water body 20. This configuration is preferable if all the transmitters use the same frequency for example. In another embodiment, the different transmitters are tuned to different frequencies in order to reduce interference. In this case, the waves can hit the opposing walls at any angle and get captured and processed by any of the receivers.

As illustrated in FIG. 2, in order to form a three dimensional grid 25, the sonar sensors 12 are deployed along three transversal axes. Preferably, the three transversal axes are orthogonal axis. For example, if the water body 20 is a rectangular swimming pool having a first pair of opposing walls and a second pair of opposing walls, a first set of sonar sensors 10 are deployed at the first pair of opposing walls and a second set of sonar sensors 10 are deployed at the second pair of opposing walls. In other terms, the sonar sensors 10 are deployed along the length, width and depth of the swimming pool. The spatial configuration of the sonar sensors 10 can take different forms. For example, if the first set of opposing walls comprises a first wall and a second wall and the second set of opposing walls comprises a third and fourth wall, the 3D grid can be formed by deploying the sonar sensors 10 on the first wall and third wall only. As another possible configuration, the sonar sensors 10 can be deployed on the first, second, third and fourth walls.

The sonar sensors 10 are preferably deployed equidistantly with respect to each other. In this case, when the sonar sensors 10 are in operation, the sonar waves propagating within the swimming pool would form a three dimensional grid 25 having uniform cubic cells.

In a monostatic configuration, the sonar sensor 10 can for example be deployed on two adjacent walls of the swimming pool (e.g. first and third walls, or second and fourth walls). According to this configuration, the sensors 10 can be deployed in consecutive rows on each one of these walls. In another possible configuration, the sensors 10 can also be deployed on all of the four walls. According to this configuration, and in order to avoid interference, the sensors facing each other on opposing walls can be deployed in such a manner to alternate in rows. For example, a first row of sensors is deployed at a first depth on the first wall, a second row of sensors is deployed at a second depth on the second wall, a third row of sensors is deployed at a third depth on the first wall, a fourth row of sensor is deployed at a four depth on the second wall, etc.

In a bistatic configuration, the transmitters 14 and receivers 16 would be facing each other on the different walls of the swimming pool in such a manner to have the sonar waves of the different sonar sensors 10 travelling between the transmitters 14 and receivers 16 without overlapping or dispersing. The number of sonar sensors 10 can vary based on the water body volume. The distance between the transmitters can also vary. The resolution can be increased by reducing the distance between the transmitters. Preferably, the distance between the transmitters is between 0.15 m to 1 m, and more preferably between 0.4-0.6 meters.

The different sonar sensors 10 may have different wave frequency/phase operation ranges in order to avoid interference between them. In this manner, if a sonar wave associated with a first sonar sensor gets reflected towards a second sonar sensor due to an obstacle for example, the second sonar sensor may filter and eliminate the reflected sonar wave since its wave frequency/phase would be outside its operation range. Alternatively, any receiver can pick and process any wave received (regardless the transmitter from which it has been sent) by identifying the transmitter from which it has been transmitted. This can be done for example if each transmitter is tuned to a different frequency and/or phase known by the receivers and/or the movement path tracing unit 30.

The sonar sensors 10 are a type of sound transmitting and receiving system. These sonar sensors 10 work by transmitting a sound pulse, called a ping, through the transmitter 14 at a specific frequency, and then receiving that same pulse through the receiver 16 placed very close to the transmitter. The transmitter 14 and receiver 16 are also called transducers because they convert energy into another form. The transmitter 14 converts an electrical signal into an acoustical pulse and the receiver 16 converts an acoustical pulse into an electrical signal. The movement path tracing unit 30 determines how long it takes to receive the pulse which, when a person is located in the line-of-sight of the transmitter, translates to the distance between the person and the receiver 16.

When the sonar sensors 10 are deployed in a three dimensional configuration such to monitor the water body, the exact 3D position of any person located within the water body can be located in real time by processing the different sonar waves captured by the different receivers 16. The movement path tracing unit 30 uses all the information received from the different receivers 16 to determine a 3D location of persons in the water body. This is by determining the exact cubic cell of the grid 25 where the person is located at a specific time.

In an embodiment of the invention, the water body is defined to include not only the water part inside the water body but also to a certain extent a certain air volume at the surface of the water. In fact, in this embodiment, the three dimensional grid 25 of sonar waves within the water body should be interpreted to extend outwardly from the surface of the water. A part of the 3D grid 25 would then be located inside the water and another part at the periphery outside the water. This is in order to detect presence/absence of a human being body outside the water (e.g. head of a person).

The sonar sensors 10 should be of a sufficient number for allowing a water body to be monitored at once making monitoring fast and accurate. Preferably, the swath width of the sonar sensors should be narrow in order to avoid overlapping between the different sonar waves associated with the different sonar sensors 10. The sonar pings several times per second allowing for a higher accuracy in the determination of the location of a person within the water body.

The ping rate is also limited by the speed of sound in water, because the transducer must wait to receive the last ping sent before generating the next one (i.e., there can only be one ping in the water at a time). This operational constraint sets an upper limit on the ping rate for a given water body dimensions. The sonar sensors 10 are adjustable in this respect.

The frequency of the sound wave is chosen high. Lower frequency waves can travel farther in a medium, such as water, because the motion of these waves is closer to a straight line. They travel through the water at a more perpendicular angle, allowing them to penetrate the medium better and not attenuate, or lose intensity, as quickly as those at higher frequencies.

Higher frequency waves, because they approach the surface of the object at more of an angle, are more likely to bounce off of the object instead of passing through it, allowing for better accuracy. More returned sound waves mean better accuracy. Therefore, for a higher accuracy, a high frequency sound wave is desirable; also, the reach scope of high frequency waves are not an issue in this application as the water body dimensions where the present system 2 is to be deployed are relatively small. Therefore, lower frequency waves may be the better choice. If the wave attenuates before it reaches an object, no echo is returned to create interference.

The sonar sensor sensors 10 are adapted to be connected the movement path tracing unit 30. In operation, the sonar sensors 12 are connected to the movement path tracing unit 30 for reporting the sonar waves received in real time. The movement path tracing unit 30 comprises a microcontroller and/or microprocessor 32 running computer software 34 adapted to process the information received from the sonar sensors 10 for determining the presence of persons inside the water body 20 and their exact location within the cells of the grid 25. The lines of the cells being formed by the different sonar waves associated with the different sonar sensors 10, the movement path tracing unit 30 is adapted to detect any crossing of these lines and therefore the presence of a person within each grid cell. This determination is carried out in real time so that the movement path tracing unit 30 is able to track the movement of a person in real time.

The movement path tracing unit 30 is also adapted to analyze the real time movement of a person for determining if that person is drowning. The algorithm is adapted to discriminate between normal swimmers and drowning persons using defined movement patterns of downing persons. The movement of a person within the water body 20 is detected and processed using the algorithm as a function of defined movement patterns of drowning persons. The algorithm would identify swimmers with suspicious movement patterns which can indicate a drowning event.

For example, the algorithm is adapted to determine if the head of a person is kept under the water for more than a certain predefined period of time (for example 10 seconds). In this case, the algorithm would identify the person as a suspicious drowning person. The algorithm can also double check that the sensors 10 detect a person at a certain depth under the water in order to confirm that there is a person inside the water who's head has not been outside the water for a certain predefined period of time. In order to implement this algorithm, the sonar sensors 10 must also be able to detect presence and/or absence of a person's head outside the water. In order to enable this detection, the 3D grid must extend outside the water extending outwardly from the surface of the water to certain height. For this, a part of the sonar sensors 10 may be placed outside the water in order to detect presence/absence of a human body between the surface of the water and the predefined height. The sensors outside the water may be any suitable type of sensors such as laser, infrared, sonar and the like.

When a drowning event is identified, the movement path tracing unit 30 sends a signal to the drowning detection unit 40 which generates an alarm signal. The drowning detection unit 40 can be connected to a security station for example for the notification of a potential drowning event. The movement path tracing unit 30 and the drowning detection unit 40 can constitute separate physical units or a same physical unit sharing the same microprocessor and/or microcontroller 32 and computer software 34 and/or located within the same computer component/system 50. If it is a separate unit, then it must comprise its own microprocessor and computer software for carrying out its functionalities.

Figure 5:
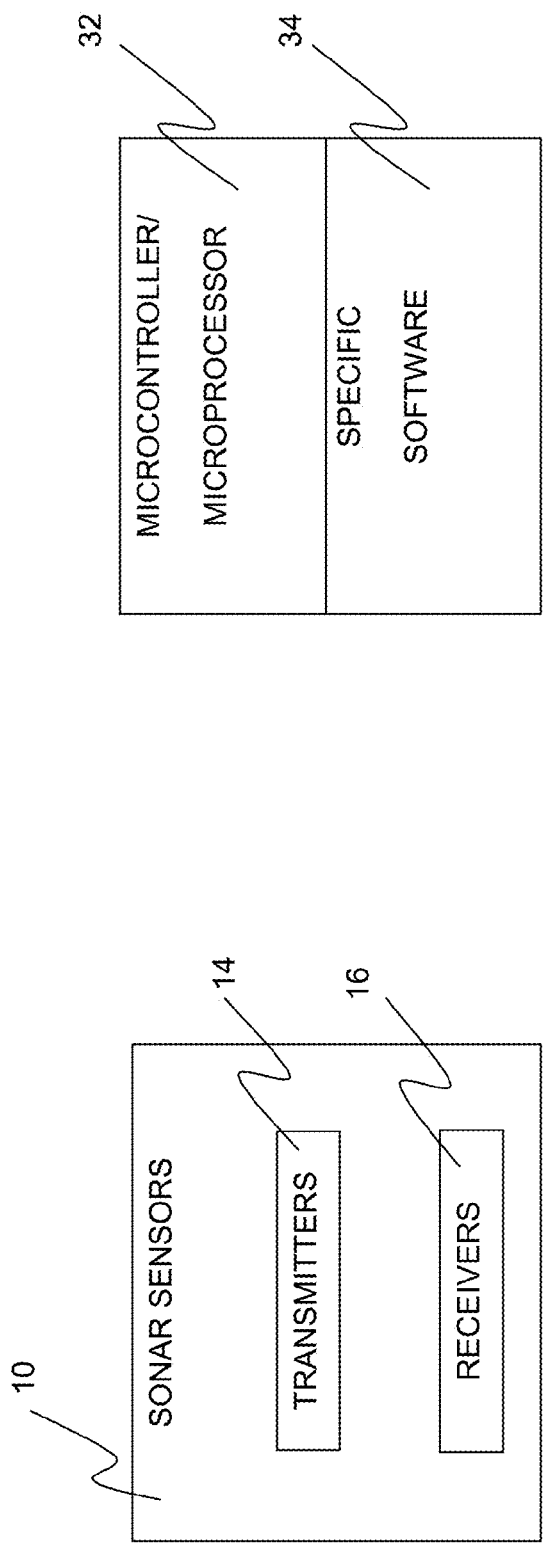
FIG. 5 is a block diagram illustrating a kit for detecting a drowning person within a water body in accordance with an embodiment of this invention.

As illustrated in FIG. 5, there is also provided a kit for detecting a drowning person within a water body, the kit comprising:

sonar sensors adapted for forming a three dimensional grid of sonar waves within the water body when deployed at the water body, the grid having three dimensional grid cells;

a microcontroller running computer instructions adapted to be connected to the sonar sensors for tracing a movement path of a person within the water body by determining a sequence of successive grid cells crossed by the person within the grid in the course of said movement path, the determination of the successive grid cells being made based on detected propagation delays of the sonar waves forming the grid, and for analysing the movement path of the person and issuing an alarm when the movement path of the person is indicative of a drowning person movement path.

Figure 6:
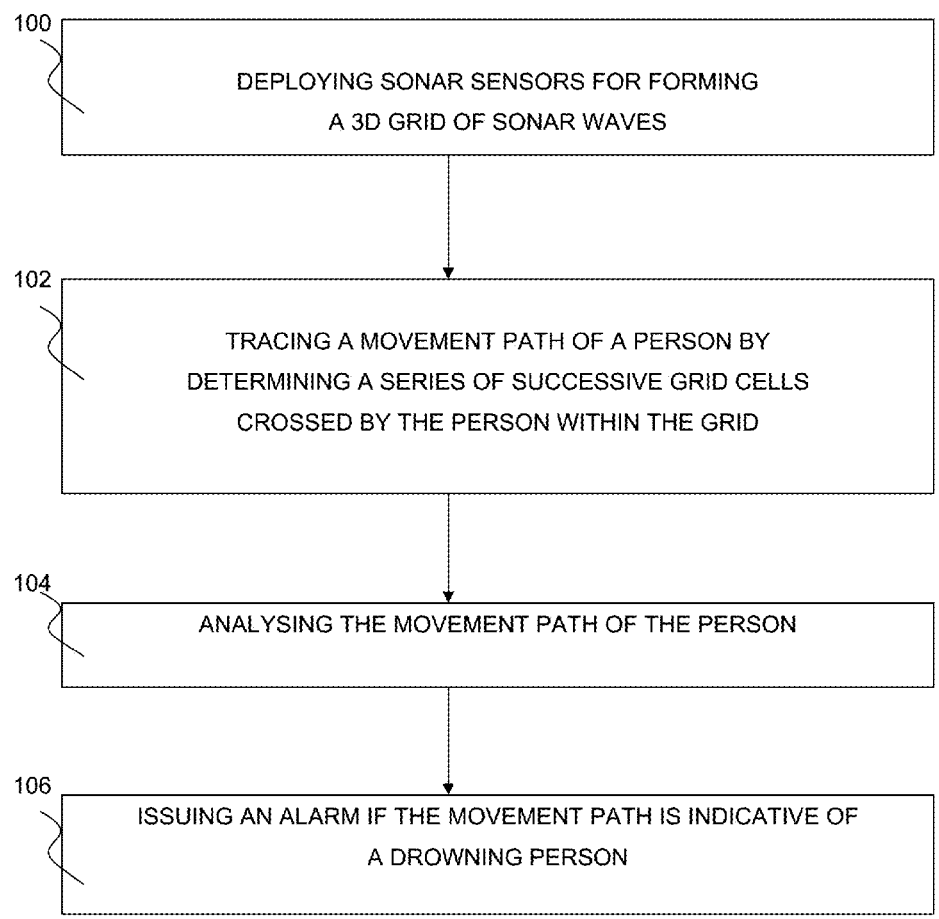
FIG. 6 is a flow chart illustrating a method for detecting a drowning person within a water body in accordance with an embodiment of this invention.

As illustrated in FIG. 6, there is also provided a method for detecting a drowning person within a water body, the method comprising:

deploying sonar sensors for forming a three dimensional grid of sonar waves within the water body, the grid having three dimensional grid cells;

tracing a movement path of a person within the water body by determining a sequence of successive grid cells crossed by the person within the grid in the course of said movement path, the determination of the successive grid cells being made based on detected propagation delays of the sonar waves forming the grid; and analysing the movement path of the person and issuing an alarm when the movement path of the person is indicative of a drowning person movement path.

In an embodiment of the invention, the water body is a rectangular swimming pool having a first and a second pair of adjacent walls, the sonar sensors being monostatic and deployed on the first pair of adjacent walls only.

In an embodiment of the invention, the sonar sensors are monostatic and deployed on both the first and second pairs of adjacent walls such that there is no overlapping between the waves.

In an embodiment of the invention, the water body is a rectangular swimming pool having a first and a second pair of adjacent walls, the sonar sensors being bistatic having separated transmitters and receivers, the transmitters being deployed on the first pair of adjacent walls and the receivers being deployed on the second pair of adjacent walls.

In an embodiment of the invention, the method further comprises adjusting the resolution of the three dimensional grid by adjusting the number of the sonar sensors and the distance therebetween.

In an embodiment of the invention, the method further comprises deploying the sonar sensors equidistantly such that the grid cells are uniform.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

Although the invention has been explained in relation to its preferred embodiment, it is to be understood that many other possible modifications and variations can be made without departing from the spirit and scope of the invention as herein described.

The invention claimed is:

1. A system for detecting a drowning person within a water body, the system comprising:
    sonar sensors for forming a three dimensional grid of sonar waves within the water body, the grid having three dimensional grid cells;
    a movement path tracing unit adapted to be connected to the sonar sensors for tracing a movement path of a person within the water body by determining a sequence of successive grid cells crossed by the person within the grid in the course of said movement path, the determination of the successive grid cells being made based on detected propagation delays of the sonar waves forming the grid;
    a drowning detection unit adapted to be connected to the movement path tracing unit for analysing the movement path of the person and issuing an alarm when the movement path of the person is indicative of a drowning person movement path.

2. The system as claimed in claim 1 wherein the three dimensional grid has three orthogonal axis.

3. The system as claimed in claim 2 wherein the water body has a longitudinal axis, a lateral axis and a vertical axis corresponding respectively to the three orthogonal axis of the grid.

4. The system as claimed in claim 1 wherein the sonar sensors are monostatic sonar sensors.

5. The system as claimed in claim 1 wherein the sonar sensors are bistatic sonar sensors.

6. The system as claimed in claim 1 wherein the grid cells are uniform.

7. The system as claimed in claim 1 wherein the grid cells are cubic.

8. The system as claimed in claim 1 wherein said grid cells are smaller or equal to 1 cubic meter in volume.

9. The system as claimed in claim 1 wherein the movement path tracing unit and the drowning detection unit comprise at least one microcontroller or microprocessor running specific computer software.

10. The system as claimed in claim 1 wherein said sonar sensors have different frequency/phase operation ranges for avoiding any interference between them.

11. The system as claimed in claim 1 wherein the movement path of the person is indicative of a drowning person movement path when the person is detected inside the water body absence of any part thereof at the periphery outside the water body for a predefined period of time.

12. The system as claimed in claim 1 wherein said sonar sensors operate at high frequency.

13. A kit for detecting a drowning person within a water body, the kit comprising:
    sonar sensors adapted for forming a three dimensional grid of sonar waves within the water body when deployed at the water body, the grid having three dimensional grid cells;
    a microcontroller running computer instructions adapted to be connected to the sonar sensors for tracing a movement path of a person within the water body by determining a sequence of successive grid cells crossed by the person within the grid in the course of said movement path, the determination of the successive grid cells being made based on detected propagation delays of the sonar waves forming the grid, and for analysing the movement path of the person and issuing an alarm when the movement path of the person is indicative of a drowning person movement path.

14. The system as claimed in claim 12 wherein the sonar sensors are monostatic sonar sensors.

15. The system as claimed in claim 12 wherein the sonar sensors are bistatic sonar sensors.

16. A method of detecting a drowning person within a water body, the method comprising the steps of:
    deploying sonar sensors for forming a three dimensional grid of sonar waves within the water body, the grid having three dimensional grid cells;
    tracing a movement path of a person within the water body by determining a sequence of successive grid cells crossed by the person within the grid in the course of said movement path, the determination of the successive grid cells being made based on detected propagation delays of the sonar waves forming the grid; and
    analysing the movement path of the person and issuing an alarm when the movement path of the person is indicative of a drowning person movement path.

17. The method of claim 16, wherein the water body is a rectangular swimming pool having a first and a second pair of adjacent walls, the sonar sensors being monostatic and deployed on the first pair of adjacent walls only.

18. The method of claim 16, wherein the water body is a rectangular swimming pool having a first and a second pair of adjacent walls, the sonar sensors being bistatic having separated transmitters and receivers, the transmitters being deployed on the first pair of adjacent walls and the receivers being deployed on the second pair of adjacent walls.

19. The method of claim 16 further comprising adjusting a resolution of the three dimensional grid by adjusting the number of the sonar sensors and a distance therebetween.

20. The method of claim 18 further comprising deploying the sonar sensors equidistantly such that the grid cells are uniform.

21. The method of claim 19, wherein the grid cells are smaller or equal to 1 cubic meter.

22. The method as claimed in claim 16 wherein the movement path of the person is indicative of a drowning person movement path when the person is detected inside the water body absence of any part thereof at the periphery outside the water body for a predefined period of time.

\* \* \* \* \*